United States Patent [19]

Kudo et al.

[11] Patent Number: 4,980,765

[45] Date of Patent: Dec. 25, 1990

[54] FRAME BUFFER MEMORY FOR DISPLAY

[75] Inventors: Yoshimichi Kudo; Shigeru Komatsu, both of Yokohama, Japan

[73] Assignee: Hitachi, Ltd., Tokyo, Japan

[21] Appl. No.: 464,214

[22] Filed: Jan. 12, 1990

[30] Foreign Application Priority Data

Feb. 8, 1989 [JP] Japan .............................. 1-027401

[51] Int. Cl.[5] .............................. H04N 5/14

[52] U.S. Cl. .............................. 358/160; 340/799

[58] Field of Search .............................. 358/160; 340/799

[56] References Cited

U.S. PATENT DOCUMENTS 4,751,573 6/1988 Kubota .............................. 358/160

4,864,402 9/1989 Ebihara et al. .............................. 358/160

FOREIGN PATENT DOCUMENTS 141485 6/1986 Japan .

*Primary Examiner*—John W. Shepperd

*Assistant Examiner*—Michael D. Parker

*Attorney, Agent, or Firm*—Antonelli, Terry, Stout & Kraus

[57] ABSTRACT

A frame buffer memory capable of storing video data for plural frames of pictures with memory areas irrelevant to the display being reduced to a minimum, which video data consist of a number of pixels unequal to a power of "2" in the vertical and horizontal directions, respectively. The frame buffer memory is realized by using multi-port video RAMs and includes a plurality of regions for display and auxiliary regions. The regions for display includes at least first and second display regions which partially overlap each other. The auxiliary regions store the video data contained in the overlapping portion (overlapping region) of the first and second display regions, the video data stored in the auxiliary region being transferred to the overlapping region as occasion requires.

5 Claims, 9 Drawing Sheets

FRAME BUFFER MEMORY FOR DISPLAY

BACKGROUND OF THE INVENTION

The present invention generally relates to a frame buffer memory for storing video data to be outputted to an image or picture display device such as a cathode ray tube (CRT) display or the like. More particularly, the invention is concerned with a frame buffer memory for display which has a storage capacity capable of storing more than two frames of video data for high definition picture consisting of pixels (picture elements) in a number unequal to $2^i$ (where i is a given positive integer) and which permits the stored video data for a given one of the plural pictures to be displayed at a high speed.

Up to now, the terminal apparatus of a computer, a work station or the like system has been equipped with a frame buffer memory as a display dedicated memory for storing and outputting the video data to be displayed. With the phrase "frame buffer memory" or "display dedicated memory", it is intended to mean such a memory which is used for storing the video data resulting from the processing performed by a CPU (central processing unit) or other processor or the video data read out from an auxiliary storage medium such as, for example, a magnetic disc system, wherein the stored video data are read out in accordance with a predetermined sequence to be outputted or displayed on a screen of a picture display apparatus such as, for example, a CRT display. In the frame buffer memory of this type, it is commonly practiced to define two-dimensionally an address space by the addresses in the rowwise direction (hereinafter referred to as the row addresses) and the addresses in the column-wise direction (hereinafter referred to as the column addresses) for the purpose of establishing correspondence between the video data stored in the memory and the picture or image to be displayed.

A structure of a typical one of the frame buffer memories known heretofore is shown in the form of a memory map in FIG. 9 of the accompanying drawings Referring to FIG. 9, a shape of a picture to be displayed is schematically shown at A and designated by a reference numeral 11. This display image or picture has an amount of information which is equal to x pixels (i.e. picture elements) in the horizontal (rowwise) direction and y pixels in the vertical (columnwise) direction. In this conjunction, it is assumed that the picture 11 is divided into two regions 12 and 13 in the horizontal direction, as indicated by a phantom line. A reference numeral 14 denotes the video data of one horizontal line of the picture 11. Illustrated in FIG. 9 at B is a most simplified method of address allocation or assignment to the frame buffer memory 15 for the picture 11 shown at A. Referring to FIG. 9B, a display region (space) 16 is established within the address space of the frame buffer memory 15 in which the column addresses correspond to the pixel positions in the horizontal directions with the row addresses corresponding to the pixel positions in the vertical direction. The number of the addresses in the horizontal direction of the frame buffer memory is represented by $2^m$ and that of the addresses in the vertical direction is represented by $2^n$.

In the conventional semiconductor memory device, the address is expressed by a binary number. Accordingly, it is convenient from the viewpoint of hardware design that the number of the addresses in the directions rowwise and columnwise, respectively, is so determined as to equal to the i-th power of "2" where i is a given integer. However, the number of the pixels stored in the frame buffer memory for display can not always be expressed by the i-th power of "2" (i=2 given integer). By way of example, when the number of the pixels in the vertical direction exceeds $2^{n-1}$ only a small value, as illustrated in FIG. 9 at B, the number of the addresses in the rowwise direction (i.e. the number of the row addresses) has to be set at $2^n$. As a result, there take place many regions or areas which do not partake in the display. At present, efforts are being made to reduce more and more the manufacturing costs of the semiconductor memory. However, a high definition picture display apparatus requires the frame buffer memory having a storage capacity ranging from several megabytes to several ten megabytes. Consequently, occurrence of many areas playing no role in the display as mentioned above is undesirable from the stand point of economy.

Further, in some of applications of the frame buffer memory such as the image processing and the like, it is required that two or more images or pictures for display can be changed over at a high speed for the purpose of enabling image comparison before and after the processing or the edition of the images. When a number of the frame buffer memories each of the structure shown in FIG. 9B are Provided to this end, the number of the areas irrelevant to the display is correspondingly increased.

A technique for solving the problem mentioned above has already been proposed, as disclosed in, for example, Japanese Patent laid-Open No. 141485/1986 (JP-A-No. 61-141485). This prior art method is illustrated in FIG. 9 at C and D. Referring to FIG. 9C and assuming that the number of the column addresses in the horizontal direction is given by $2^k$, the video data of the picture or image 11 is divided into two regions (corresponding, respectively, to the regions 12 and 13 shown at A in FIG. 9) to be stored in a frame buffer memory 17 at regions or spaces 18 and 19, respectively. Parenthetically, it is assumed that the number of the row addresses in the vertical direction is given by $2^j$. In the example illustrated in FIG. 9D, the row addresses ($2^j$) of a frame buffer memory 20 do not correspond to the pixel positions (y) in the vertical direction but all the pixel data are regarded as one-dimensional video data and stored at the successive addresses. By way of example, the video data of one line (corresponding to the video data 14 of one line shown at A in FIG. 9) is stored in the frame buffer memory 20 over two rows as indicated at 21 and 22.

According to the prior art method mentioned above, the semiconductor memory is assumed to be constituted by a general purpose dynamic RAM (random access memory). In recent years, however, it is common to realize the semiconductor memory for display by using a multi-port video RAM which is provided with a random port and a serial port. More specifically, the multi-port video RAM is equipped with a serial port which allows a high-speed read-out of the video data in addition to the random port of the ordinary RAM. By dedicating the serial port only to the read-out of the video data, efficiency in the access to the frame buffer memory by a CPU or a drawing processor by way of the random port can be enhanced.

Under the circumstances, application of the multi-port video RAM to the prior art frame buffer memory has been examined, which gives birth to the problems mentioned below.

The reading of the video data from the multiport RAM through the serial port is effected in such a manner that the addresses from which the video data are to be read out are set at the random port, whereon the video data of one row is transferred to a shift register provided on the side of the serial port, which is then followed by the read-out of the video data in the order of the column addresses. Accordingly, when the frame buffer memory is used in a manner illustrated in FIG. 9C, there arises such a situation in which the reading of the video data starts from an intermediate one of the column addresses in the region 19 corresponding to the region 13, because the number of the column addresses of the frame buffer memory 17 is greater than the horizontal width of the region 13 of the image or picture 11. In that case, the intermediate address differs from one to another row, which in turn means that the memory control for storing the video data in the region 19 is necessarily much complicated. Besides, in case the video data of the region 13 of the picture 11 is to be stored row by row in the region 19 of the frame buffer memory 17, the row in the number of y are required. This means that the number of rows given by $2^j$ of the whole display region is insufficient. Consequently, the aimed effect of reducing the storage capacity can not be attained.

In conjunction with the multi-port RAM, it is further noted that the video data transfer from the random port to the serial port has to be performed in timing with the read-out of the video data from the serial port. Besides, refresh operation must be performed as in the case of the general purpose dynamic RAM, during which the ordinary write/read operation of the video data by way of the random port can not be carried out. Conventionally, the refresh operation is performed under the control of a CRT controller connected to the frame buffer memory, wherein the timing for the refresh operation is so determined as to fall within the horizontal blanking period of the video signal. Accordingly, when the frame buffer memory is configured as shown in FIG. 9 at D, the data transfer to the serial Port takes place in the course of lapse of the horizontal blanking period. As a result, the access through the random port is often interrupted.

Further, in conjunction with the prior art method illustrated at D in FIG. 9, it must be pointed out that the procedure for calculating the values of the addresses at which the video data of concern are stored is much complicated (involving correspondingly an increase in the processing time), giving rise to a problem.

SUMMARY OF THE INVENTION

It is therefore an object of the present invention to provide a frame buffer memory for display implemented by using a multi-port video QRAM which memory allows a plurality of pictures or images to be exchangeably displayed with areas irrelevant to the display of the pixels being reduced to a possible minimum.

For achieving the above object, there is provided according to an aspect of the present invention a frame buffer memory having column addresses corresponding to pixel positions in the horizontal direction and row addresses corresponding to the pixel positions in the vertical direction, respectively, wherein video data are disposed on the address space defined by the column and row addresses. The frame buffer memory comprise at least two regions or areas for display (hereinafter referred to as the display regions), wherein the column addresses includes a number of addresses which corresponds to that of the pixels in the horizontal direction, starting form the zero-th address, while at least one overlapping display region (hereinafter referred to as overlapping region) is provided by overlapping partially the two adjacent display regions in the vertical direction, and wherein at least one auxiliary region is provided at a location close to the display regions and the overlapping region for accommodating the video data in an amount corresponding to the overlapping region.

The maximum value of the row address of the frame buffer memory is so selected as to be given by a power of "2". The video data in excess which can not be accommodated within the plural display regions because of lack of the row addresses are stored in the auxiliary region. In other words, the video data are recorded, being divided, on the areas of the display regions which do not overlap each other and on the auxiliary region. Upon exchanging of the display regions for changing over the picture or image for display on the screen, the video data stored in the auxiliary region are transferred to the overlapping region.

In this manner, all the video data can be stored in the frame buffer memory even when the number of all the row addresses is smaller than that of the pixels in the vertical direction of all the display regions Besides, a plurality of pictures or images for display can be changed over to one another at a high speed. Thus, there is provided according to the invention a frame buffer memory which is capable of storing the video data for a plurality of pictures (frames) even when the video data do not correspond to the number of the pixels given by the powers of "2" in the vertical and horizontal directions of the display and which allows the pictures to be changed over to one another at a high speed with the areas playing no parts for display being reduced to a minimum.

DESCRIPTION OF THE PREFERRED EMBODIMENTS

Now, the present invention will be described in detail in conjunction with preferred or exemplary embodiments thereof by reference to the drawings. In the following description, it is assumed that the number of video data is equal to 1920×1035 pixels (picture elements) and that the number of images or pictures to be displayed through changing-over is two (frames).

Figure 1:
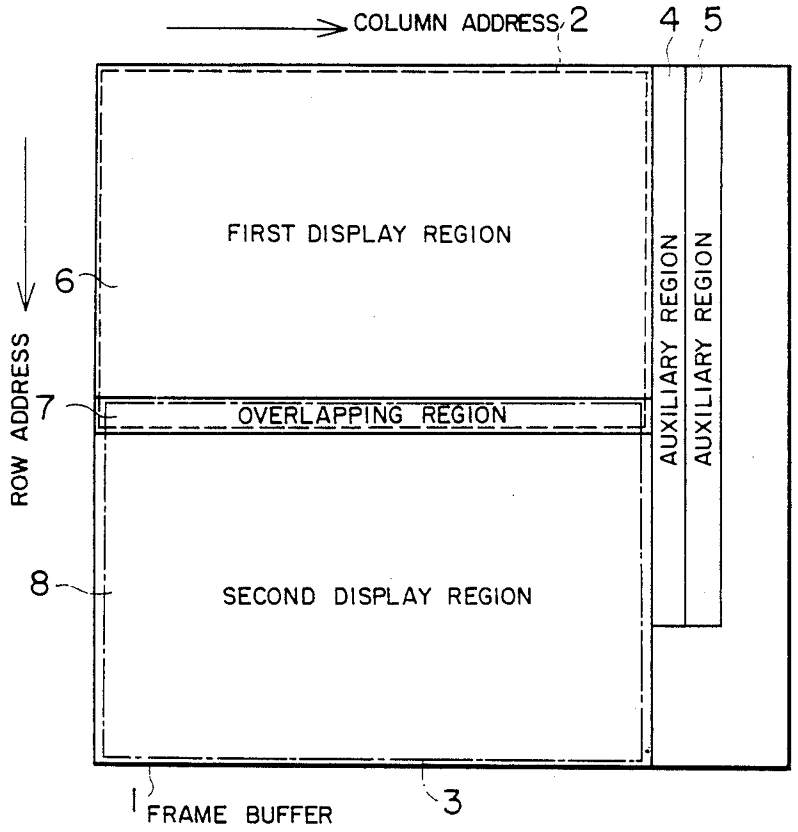
FIG. 1 shows a memory map for illustrating a structure of the frame buffer memory according to a first embodiment of the invention.

FIG. 1 shows a memory map illustrating the address space of the frame buffer memory 1 according to the present invention. In the figure, column addresses of the frame buffer memory are taken in the horizontal direction with the row addresses being taken in the vertical direction. In the address space of the frame buffer memory 1, there are provided a first display region 2, a second display region 3, a first auxiliary region 4 and a second auxiliary region 5. The number of the pixels or picture elements to be displayed is 1920 in the horizontal direction and 1035 in the vertical direction. On the other hand, in the frame buffer memory 1, the maximum number of the row addresses and that of the column addresses are selected to be 2048, respectively. Consequently, the two display regions (i.e. the first and second display regions 2 and 3) can not be provided, as they are, in the direction of the row address (i.e. in the vertical direction), because the number of the row addresses is short by 22 rows. Accordingly, the two display regions 2 and 3 are so provided as to partially overlap each other. Thus, the first display region 2 indicated as enclosed by a broken line in FIG. 1 is composed of a non-overlapping area 6 which does not overlap the second display region 3 and an overlapping area 7 which is shared in common by the second display region 3 for storing the video data. With this arrangement of the frame buffer memory 1, the video data can be stored in such a manner that the pixel positions in the horizontal direction correspond to the column addresses in the horizontal direction of the frame buffer memory, while the pixel positions in the vertical direction correspond to the row addresses in the vertical direction of the frame buffer memory. The number of the addresses required for the first display region is given by 1920 (columns)×1035 (rows), as mentioned above. On the other hand, the second display region 3 is composed of the overlapping area 7 and a non-overlapping area 8. The video data are stored in the second display region 3 in the same manner as in the case of the first display region 2. The number of the addresses in the second display region 3 is equal to that of the first display region 2. It is however, noted that there accrues an unused area corresponding to 128 columns in the direction of the column address. The first auxiliary region 4 and the second auxiliary region 5 are each of 22 rows×1920 columns. Under the circumstances, the addresses of the auxiliary regions 4 and 5 are so established that the sequential relation in magnitude of the row addresses and the column addresses for the video data contained in the overlapping area 7 is reversed in the auxiliary regions, wherein the video data in the overlapping area 7 is stored in the auxiliary regions 4 and 5 with the address sequence being reversed.

More specifically, when the video data of one picture or frame stored in the first display region 2 is being displayed, the video data of the other picture or frame is stored, being divided, in the region 8 and the auxiliary region 5. Similarly, when the video data of one picture frame stored in the second display region 3 is being displayed, the video data of the other frame is stored in the region 6 and the auxiliary region 4.

Next, description will be made of a structure of an image processing apparatus incorporating the frame buffer memory according to the invention by reference to FIG. 2 which is a block diagram showing an arrangement of a first embodiment of the image processor to which the invention can be applied.

Figure 2:
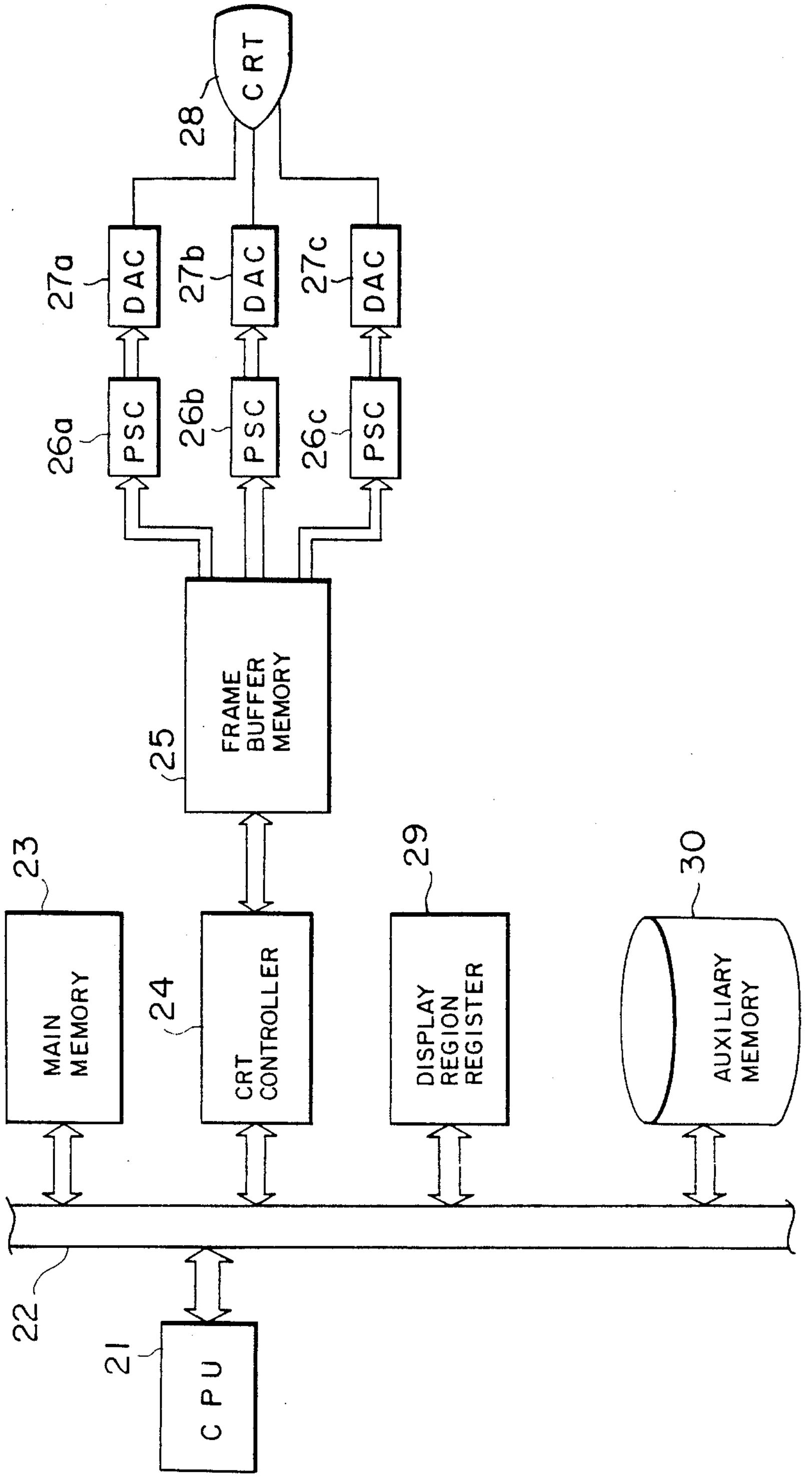
FIG. 2 is a block diagram showing a general arrangement of an image processing apparatus in which the frame buffer memory according to the first embodiment of the invention is adapted to be employed.

In FIG. 2, a central processing unit (CPU) 21 is connected to a main memory 23, a cathode ray tube (CRT) controller 24, a display region register 29 for the region to be displayed and auxiliary memory equipment 30 comprising recording media such as magnetic discs by way of buses denoted generally by 22. The CRT controller 24 serves to supply an address signal, the video data and a memory access signal to the frame buffer memory 25. The video data read out from the frame buffer memory 25 is converted into serial data by parallel-to-serial converters (PSC) 26a, 26b and 26c provided separately for color component R (red), G (green) and B (blue), respectively. Subsequently, the video data are converted to corresponding analogue signals through digital-to-analogue converters (DAC) 27a, 27b and 27c provided separately for the color signals (R, G, B), respectively. The analogue video data signals resulting from the D/A conversion are supplied to the CRT display unit 28.

Figure 3:
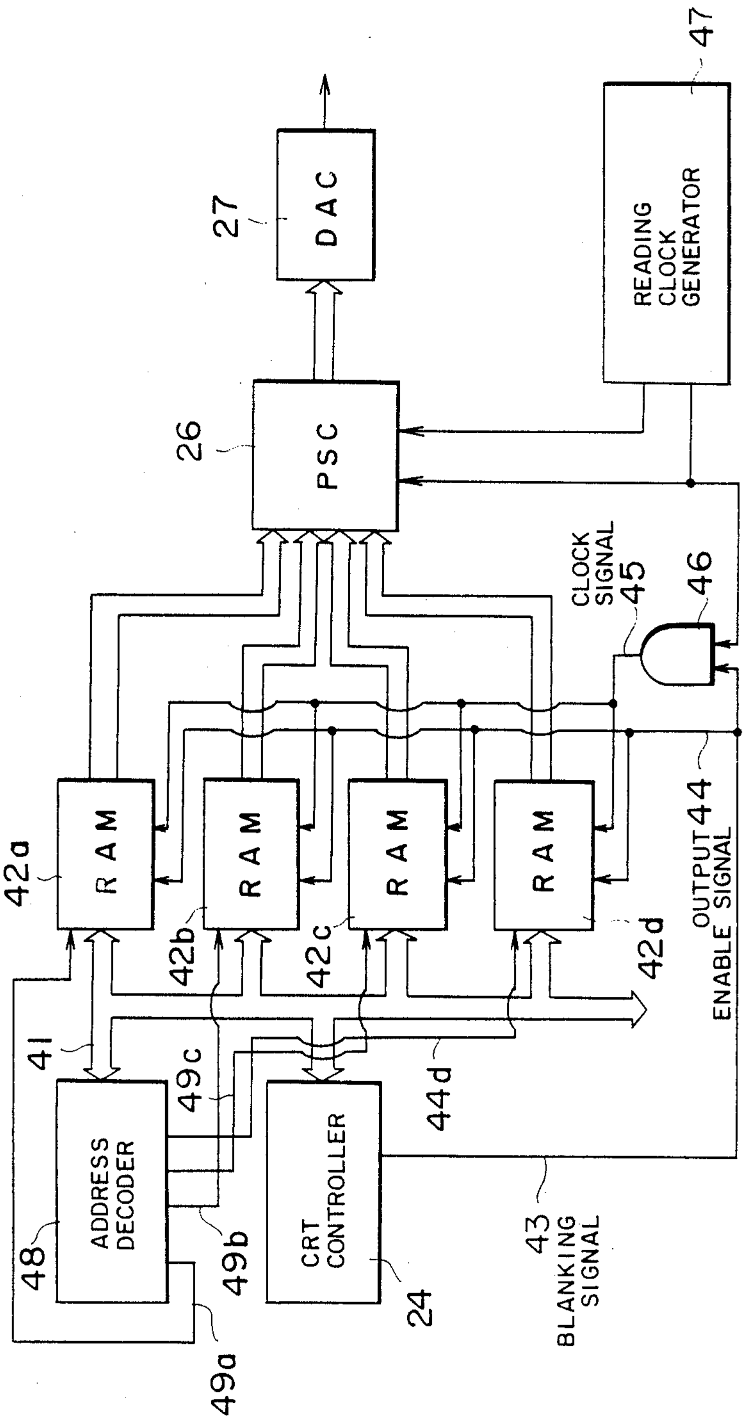
FIG. 3 is a block diagram showing a circuit arrangement of a major portion of the image processor apparatus shown in FIG. 2.

FIG. 3 is a block diagram showing in more detail a major part of the image processing apparatus shown in FIG. 2 for one of the color channels (R, G, B) on the assumption that the bit number of the video signal per pixel is set to 4 bits. Further, it is assumed that the frame buffer memory 25 is constituted by multi-port video RAMs (random access memory) each having a capacity of 1M bits for storing the video data.

The CRT controller 24 supplies via a bus 41 the address, video data and the memory access signals to the multi-port video RAMs 42a to 42d each having the storage capacity of 1M bits. An address decoder 48 decodes the addresses supplied from the CRT controller 24 to supply select signals 49a to 49d to the RAMs 42a to 42d, respectively. The select signals 49a to 49d are so generated that when the least significant two bits (i.e. two LSBs) of the addresses are "00", "01", "10" and "11", the associated RAMs 42a 42b, 42c and 42d are selected correspondingly. Under the timing of a clock signal 45 generated by a reading clock generator circuit 47, the video data consisting of four pixels are read out simultaneously from the RAMs 42a, 42b, 42c and 42d, respectively. The video data of the four pixels is converted to the serial video data by the parallel-to-serial converter (PSC) 26. The serial video data is then supplied to the digital-to-analogue converter (DAC) 27.

Each of the multi-port video RAMs 42a to 42d having the storage capacity of 1M bits, respectively, has an address structure of 512 columns×512 rows×4 bits. Accordingly, the RAMs 42a to 42d connected to one another constitute a memory block of 2048 columns×512 rows×4 bits. In each of the multi-port video RAMs 42a to 42d, the video data of one row can be read out consecutively upon single transfer of the serial data. Thus, in the case of the memory block mentioned above, the video data of 2048×4 bits can be read out through the single data transfer. In other words, 1920 data constituting the video data corresponding to one horizontal scanning line period of the display are read out through the single data transfer. To say in another way, the data transfer is carried out by making use of only the horizontal blanking period of one horizontal scanning period. During the horizontal blanking period, a blanking signal 43 is supplied to an AND gate 46, as a result of which the clock signal 45 is inhibited from being supplied to the RAMs 42*a*–42*d*. At the same time, an output enable signal 44 for controlling the output states of serial ports of the RAMs 42*a*–42*d* is set to the disabled state. Consequently, no unnecessary data is displayed on the CRT display 28.

The structure shown in FIG. 3 is for the memory block of 512 rows. It should however be understood that the structure shown in FIG. 3 can be expanded on a 512-row basis by providing additional memory blocks of the same configuration, wherein more significant row addresses are decoded for selecting the memory blocks on a block-by-block basis. The circuit shown in FIG. 3 is only for one of the color channels R, G and B. It will however be readily understood that the utterly same circuit configuration can be adopted for each of the other color channels. Besides, expansion of the bit number per pixel from 4 bits to 8 bits can be achieved by additionally providing one set of the memory block shown in FIG. 3.

Figure 4:
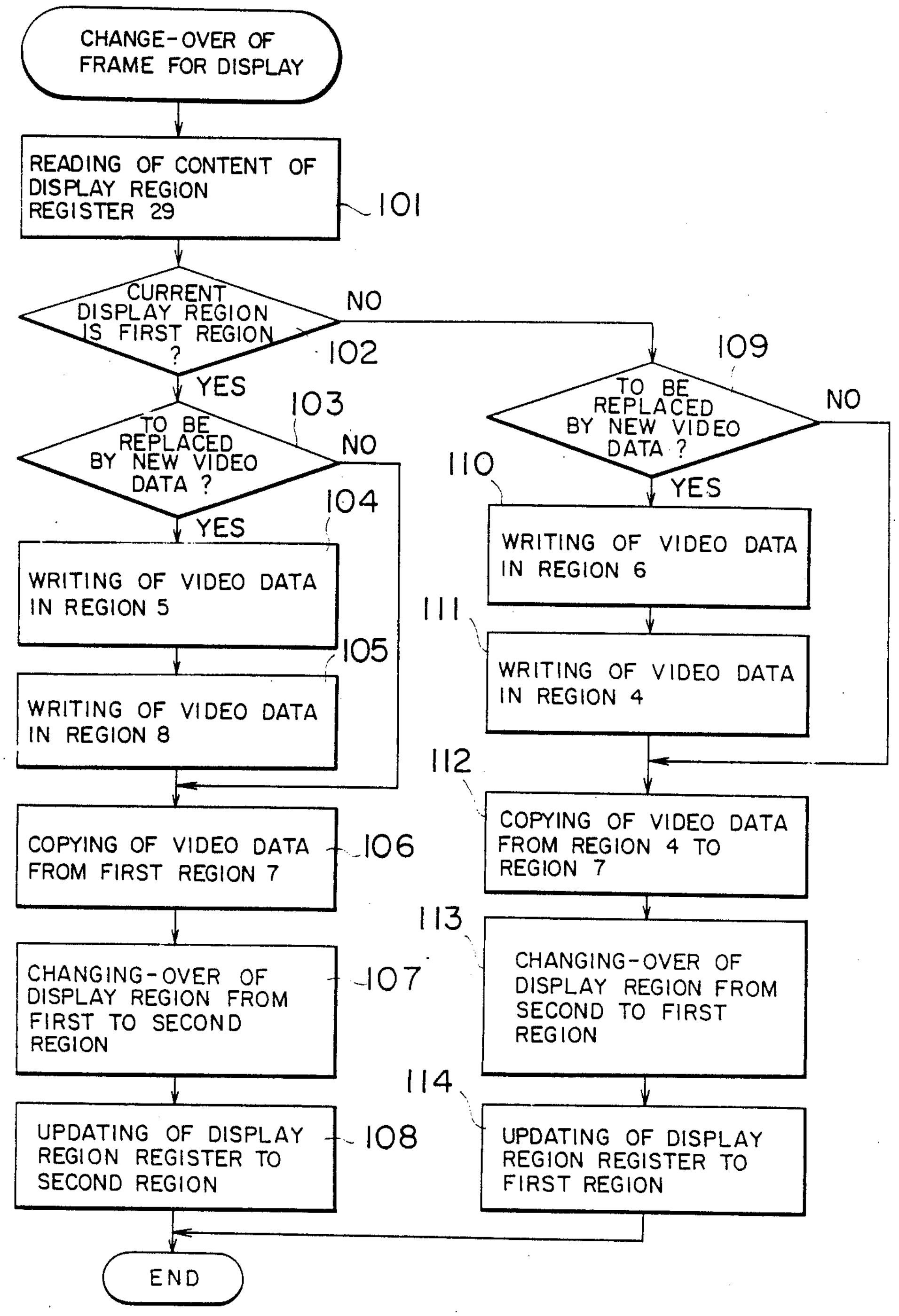
FIG. 4 is a flow chart for illustrating procedure of changing over pictures for display by using the frame buffer memory according to the first embodiment of the invention.

FIG. 4 shows in a flow chart a procedure for changing over the picture to be displayed on a display screen of the image processor apparatus shown in FIG. 2. The regions 4 to 8 appearing in this figure correspond to those designated by the same reference numerals in FIG. 1, respectively.

Now, referring to FIG. 4, for changing over the picture for display, the content of the display region register 29 (i.e. the register for the region to be displayed) is read out at a step 101. In this conjunction, it is to be mentioned that the display region register 29 has been placed with the data indicating which of the video data stored in the first and second display regions 2 and 3 of the frame buffer memory is used for the picture being currently displayed on the screen of the CRT display 28. On the basis of the data read out from the register 29, decision is made at a step 102 as to the display region being currently used. In succession to the decision step 102, it is decided whether or not the frame buffer memory (the multi-port video RAM assembly) 25 is to be rewritten with new video data at a step 103 or 109. When the video data being currently displayed is to be displayed in succession, the answer of the decision step 102 or 109 is negative (No) and otherwise affirmative (Yes).

When it is determined as the result of the decision steps mentioned above that the video data stored in the first display region 2 is being currently used and that writing of new data is to be performed, the video data of 22 lines counted from the top of the picture (frame) is written in the second auxiliary region 5 at a step 104. Subsequently, the remaining video data are written in the area 8 of the second display region 3 at a step 105. Subsequently, the video data stored in the second auxiliary region 5 is copied to the overlapping region 7 at a step 106. Then, the content of a corresponding register provided internally of the CRT controller 26 is rewritten or updated, whereupon the change-over of the display region from the first display region 2 to the second display region 3 is performed at a step 107. At the same time, the content of the display region register 29 is rewritten correspondingly at a step 108. In case it is decided at the step 103 that no new data is to be written, the processing for writing the video data into the auxiliary region 5 and the region 8 is not executed.

Assuming now that the video data of the second display region 3 is used for the picture being currently displayed and that the content of the frame buffer memory 25 is to be rewritten, the video data of 1013 lines counted from the top of the picture (frame) are written in the area 6 of the first display region 2 at a step 110, being then followed by a step 111 at which the video data of the remaining 22 lines are written in the auxiliary region 4. Subsequently, the video data stored in the auxiliary region 4. Subsequently, the video data stored in the auxiliary region 4 is copied or mapped to the overlapping region 7 at a step 112. The display region to be used is then changed over from the second display region 3 to the first display region 2 at a step 113, whereon the content of the display region register 29 is correspondingly updated at a step 114. In case the decision is made at the step 109 to the effect that the rewriting or updating of the frame buffer memory is unnecessary, the processing is performed by skipping the steps 110 and 111.

For realizing the picture exchange at a high speed by changing over the first and second display regions 2 and 3 of the frame buffer memory 1, the steps 104, 105 and 110, 111 shown in the flow chart of FIG. 4 which take lots of time among all are skipped. However, the time required for executing the processing steps 106 and 112 presents still a problem to be solved. In the case of the illustrated embodiment, the number of the video data to be transferred corresponds to $22\times1920$ pixels. Accordingly, when the steps 106 and 112 are executed by making use of the video data transfer by the CPU 21 or the copy command issued by the CRT controller 24 or the like, the time taken for the transfer of all the video data amounts to no more than 0.05 sec on the assumption that the data transfer for each pixel requires 1 μsec. This means that the high-speed response capability can be protected against degradation even at the time of the picture exchange.

Parenthetically, it should be mentioned that the sequences of the step 106 to the step 108 and the step 112 to the step 114 may be reversed.

As will now be appreciated, it is possible according to the teachings of the invention incarnated in the embodiment described above to store two frames of the video data for the pictures each containing the pixels in the number of $1920\times1035$ and to change the picture or frame for display at a high speed. The frame buffer memory can be constituted by using the multi-port video RAMs.

It must here be pointed out that the present invention is never limited to the pixel number of one frame mentioned above in conjunction with the illustrated embodiment. In reality, the pixel number can be selected rather arbitrarily so far as the condition given by the following expression (1) are satisfied:

$$x\times y<2^{n+m-1} \quad (1)$$

where x represents the number of the pixels in the horizontal direction, y represents the number of the pixels in the vertical direction, n represents an integer satisfying $2^{n-1}<x<2^{n}$, and m represents an integer satisfying $2^{m-1}<y<2^{m}$.

On the condition given by the expression (1), it can be generalized that by using the address space of $2^{n-1}$ (rows)$\times 2^m$(columns)$\times$k(planes), the video data of k frames can be displayed by changing over the frame from one to another. The video data of the rows in excess of $2^{n-1}$ in one frame of the video data can be stored by providing an auxiliary region columnwise in the area not used.

In conjunction with the storage of video data in the auxiliary region, it should be noted that the alteration of the relation between the row addresses and the column addresses as described hereinbefore can be rendered unnecessary by distributing the video data of one row of the display region over several rows of the auxiliary region, by way of example. Further, it should be added that the data writing and copying to and from the auxiliary region is performed necessarily through the random port. Consequently, the access can be made to the row arbitrarily at any intermediate position thereof. The advantage of the storage of the video data in the auxiliary region with the row addresses and the column addresses being replaced can be obtained in such a case where the video data within a rectangular region is to be copied with a rotation of 90° by the CRT controller. At that time, the CPU may issue the copy instruction only once to the CRT controller, whereby the burden imposed on the CPU can be correspondingly mitigated.

Figure 5:
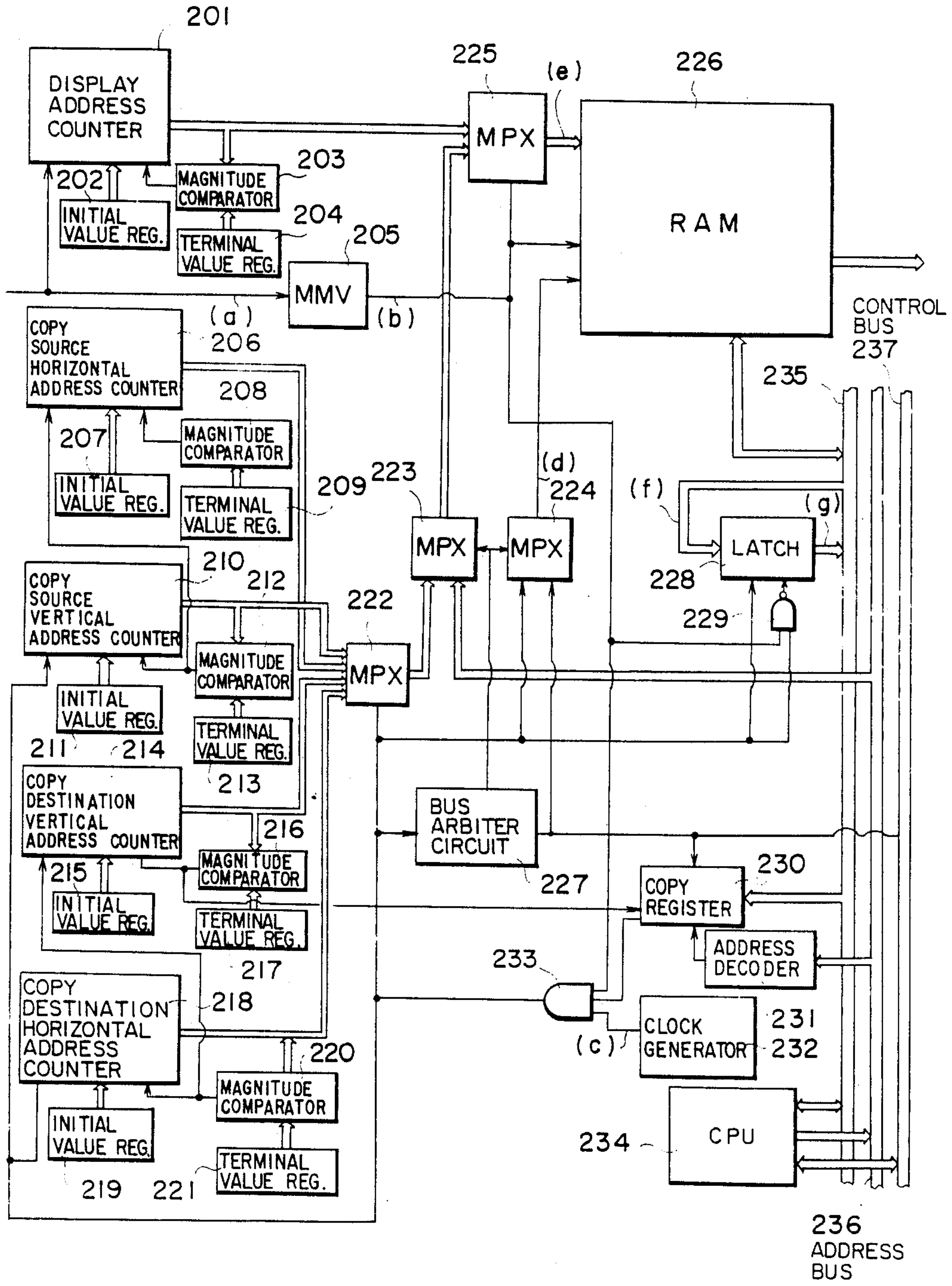
FIG. 5 shows a structure of another image processing apparatus to which the present invention can be applied.

FIG. 5 shows in a block diagram a structure of the image processing apparatus according to a second embodiment of the present invention. This image processing apparatus includes a circuit for replacing partially the column address and the row address (e.g. by exchanging a more significant byte of an address consisting of two bytes with the other byte of less significance) to thereby copy the altered addresses upon transfer of the video data from the auxiliary region to the overlapping region.

Referring to FIG. 5, there are provided five counters for supplying the address data to the frame buffer RAM (multi-port video RAM) unit 226. They are a first counter 201 for supplying the display address, a second counter 206 for supplying the column address of the auxiliary region which constitutes a copy source of the video data (i.e. the region from which the video data is to be copied), a third counter 210 for supplying the row address of the auxiliary region which constitutes a copy source of the video data, a fourth counter 214 for supplying the column address of the overlapping region which is a destination to which the video data is to be copied (region to which the video data is to be copied), and a fifth counter 218 for supplying the row address of the overlapping region constituting the destination to which the video data is to be copied.

The counter 201 has a load input terminal supplied with the initial value data from a register 202. The counter 206 has a load input terminal supplied with the initial value data from a register 207. The counter 210 has a load input terminal supplied with the initial value data from a register 211. The counter 214 has a load input supplied with the initial value data from a register 215. Finally, the counter 218 has a load input supplied with the initial value data from a register 219.

The count data outputted from the counter 201 is supplied to one of the inputs of a magnitude comparator 203. The count data outputted from the counter 206 is supplied to one of the inputs of a magnitude comparator 208. The count data outputted from the counter 210 is supplied to one of the inputs of a magnitude comparator 212. The count data outputted from the counter 214 is supplied to one of the inputs of a magnitude comparator 216. Finally, the count data outputted from the counter 218 is supplied to one of the inputs of a magnitude comparator 220.

The magnitude comparator 203 has the other input supplied with the terminal (end) value data from a register 204. The magnitude comparator 208 has the other input supplied with the terminal value data from a register 209. The magnitude comparator 212 has the other input supplied with the terminal value data from a register 213. The magnitude comparator 216 has the other input supplied with the terminal value data from a register 217. Finally, the magnitude comparator 220 has the other input supplied with the terminal value data from a register 221.

The magnitude comparator 203 compares the two input signals and supplies an output signal representing the result of the comparison to a preset input of the counter 201. In the similar manner, the magnitude comparator 208 supplies the output signal to a preset input of the counter 206. The output signal of the magnitude comparator 212 is supplied to a preset input of the counter 210 and to a clock input of the counter 206. The output signal of the magnitude comparator 216 is supplied to a preset input of the counter 214. The output signal of the magnitude comparator 220 is supplied to a preset input of the counter 218 and to a clock input of the counter 214. The counter 201 has a clock input supplied with the horizontal synchronizing signal ($H_{sync}$(a)). Supplied to a clock input of the counter 10 and to a clock input of the counter 218 through an AND gate 233 is a clock signal (c) which is generated by a clock generator 232.

Thus, the individual counters 201, 206, 210, 214 and 218 count the clock signals applied thereto to thereby output the count data of values between the initial value and the terminal value. The count data of the counter 201 is supplied not only to the magnitude comparator 203 but also to a multiplexer (MPX) 225. Similarly, the count data of the counters 206, 210, 214 and 218 are supplied to a multiplexer (MPX) 222 as well. In this context, it is to be noted that the count data mentioned above indicate the address of the copy source and that of the copy destination. The multiplexer 222 selects the count data as supplied thereto on the basis of the signal supplied from the AND gate 233. Subsequently, the selected count data is supplied to a multiplexer (MPX) 223 from the multiplexer (MPX) 222.

The multiplexer (MPX) 223 selects either one of the count data (address) supplied from the multiplexer 222 or the address supplied from the CPU 234 through an address bus 236. This selection is performed on the basis of a signal supplied to the multiplexer 223 from a bus arbiter circuit 227. The output data from the multiplexer 223 is supplied to a multiplexer (MPX) 225 which selects either one of the output data from the multiplexer 223 or the count data supplied from the counter 201. The selected data (e) outputted from the multiplexer 225 is supplied to the frame buffer RAM unit 226. This selection performed by the multiplexer 225 is effectuated by a data transfer signal DT(b) supplied from a monostable multi-vibrator (MMV) 205.

The monostable multi-vibrator (MMV) 205 is supplied with the horizontal synchronizing signal $H_{sync}$ (a) to thereby send out the data transfer signal DT (b) to the frame buffer RAM unit 226, the AND gate 223 and a NAND gate 229 in addition to the multiplexer (MPX)

225. The AND gate 223 is supplied with a signal from a copy register 230 as well. The three input signals supplied to the AND gate 233 as mentioned above are logically ANDed, whereby a clock signal is outputted. The clock signal outputted from the AND gate 233 is supplied to the bus arbiter circuit 227, the NAND gate 229, the multiplexer (MPX) 224 and a latch 228 as well.

Through the NAND gate 229, the clock signal supplied from the AND gate 233 and the data transfer signal DT(b) supplied from the monostable multi-vibrator 205 are logically NANDed, whereon the output signal of the NAND date 226 is supplied to an output-enable input terminal of the latch 228, which stores temporarily the input data (f) in response to the clock signal supplied from the AND gate 233. Incidentally, the data input and the data output of the latch 228 are connected to the data bus 235. In the figure, (g) designates the output data.

The bus arbiter circuit 227 is supplied with a memory access signal from the CPU 234 via the control bus 237 and monitors the clock signal supplied from the AND gate 233 and the memory access signal. In dependence on the state being monitored, the bus arbiter circuit 227 supplies a change-over signal to the multiplexer (MPX) 224 which is also supplied with the memory access signal from the CPU 234 via the control bus 237 and selects either one of the clock signal supplied from the AND gate 233 or the memory access signal mentioned above in response to the change-over signal supplied from the bus arbiter circuit 227. A signal WE (d) outputted from the multiplexer 224 is supplied to a write enable input of the frame buffer RAM unit 226. The data input/output ports of the frame buffer RAM unit 226 are connected to the CPU 234 via the data bus 235. Outputted from the display data output of the frame buffer RAM 226 is the video data.

On the other hand, the input and the output of the CPU 234 are connected to the control bus 237, the address bus 236 and the data bus 235. Through these buses 235 to 237, the CPU 234 supplies signals (data and address signals) to the individual blocks. More specifically, the CPU 234 supplies the address signal to the address decoder 231 as well via the address bus 236. Further, the CPU 234 supplies the data to the cop register 230 via the data bus 235. Additionally, the CPU 234 supplies the memory access signal to the copy register 230 via the control bus 37.

The address decoder 231 decodes the address signal supplied from the CPU 234, whereon the signal resulting from the decoding is supplied to the copy register 230. The output signal from the copy register 30 is supplied to the AND gate 233. In this way, the clock signal (c) generated by the clock generating circuit 32 undergoes the ON/OFF control. It is should be added that the output signal of the copy register 230 is cleared by the output signal of the magnitude comparator 216.

Next, description will be turned to operation performed upon transfer of the video data from the auxiliary region of the frame buffer RAM unit to the overlapping region with the column address and the row address being mutually replaced.

At first, a value indicating the initiation of copying operation is written in the copy register 230 from the CPU 234. As a result of this, the output signal of the copy register 230 assumes a high level. On the other hand, the clock signal generated by the clock generating circuit 232 is supplied to the counters 210 and 218 via the AND gate 233. Further, the value of the row address of the topmost pixel in the auxiliary region is placed in the register 211 (as the initial value), while the value of the row address of the lowermost pixel in the auxiliary field is placed in the register 213 (as the terminal value). Besides, the value of the column address of the leftmost pixel in the overlapping region is placed in the register 219 (as the initial value), while the value of the column address of the rightmost pixel in the overlapping region is placed in the register 221 (as the terminal value). Similarly, the values of the column addresses of the leftmost and rightmost pixels in the auxiliary region are placed in the registers 207 and 209, respectively, while the values of the addresses of the topmost and lowermost pixels in the overlapping region are placed in the registers 215 and 217, respectively.

Every time the clock signal is supplied from the AND gate 233, the counters 210 and 218 are incremented one by one. When the count data of the counters 210 and 218 have reached the respective terminal values, the output signals of the magnitude comparators 212 and 220 are changed over, as a result of which the count data of the counters 210 and 218 are reset to the initial value. At the same time, the count data of the counters 206 and 214 are incremented by one, respectively. When the count data of the counter 206 and 214 have ultimately reached the terminal value, the counters 206 and 214 are reset to the initial value. At that time, the output signal of the copy register 230 is cleared, whereupon the transfer operation of the video data has been completed.

Figure 6:
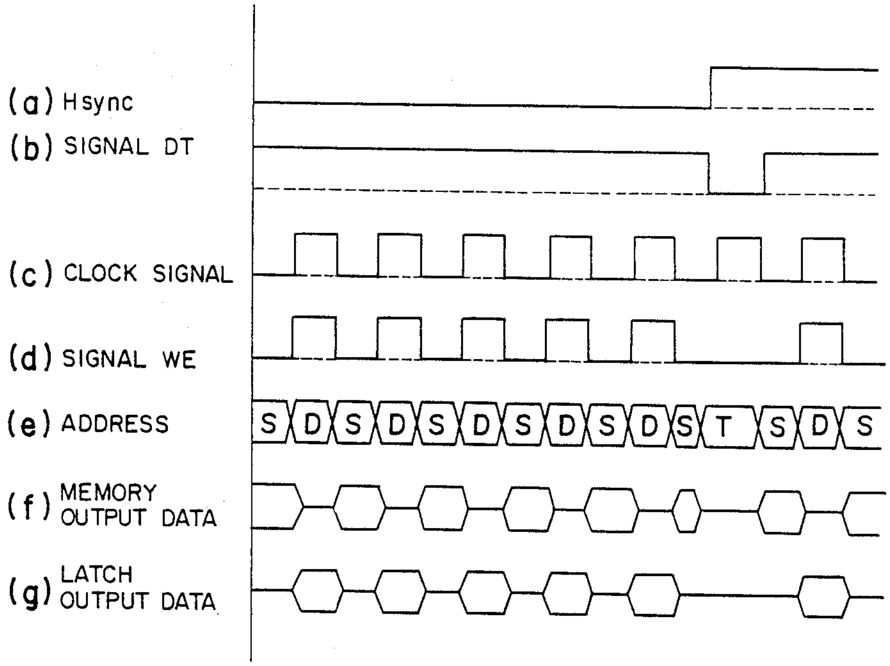
FIG. 6 is a time chart showing major signals generated in the image processing apparatus shown in FIG. 5.

FIG. 6 is a timing chart illustrating the major signals generated in the image processing apparatus shown in FIG. 5 for elucidating the outline of the transfer operation. In FIG. 6, the reference symbols (a) to (g) have the same meanings as the corresponding symbols shown in FIG. 5.

Now, the transfer operation will be described in more detail by reference to FIG. 6. The multiplexer 222 changes over the addresses in accordance with the output signal of the AND gate 233. As a consequence, the frame buffer RAM unit 226 is supplied with the addresses of the video data of the auxiliary region (S at (e) in FIG. 6) during an earlier half of one clock period of the clock signal (c), while the RAM 226 is supplied with the addresses of the video data of the overlapping region (D at (e) in FIG. 6) during the latter half of the one clock period of the clock signal (c). There is shown in FIG. 6 at (d) a waveform of the signal WE supplied to the write enable input of the frame buffer RAM unit 226. Parenthetically, the write clock signal supplied to the latch 228 is of the same waveform as the signal WE mentioned above. Thus, the video data of the auxiliary region is read out from the frame buffer RAM unit 226 (FIG. 6, (f)) to be temporarily stored in the latch 228 in response to the rise-up edge of the write enabling clock signal. Subsequently, during the high-level period or duration of the signal WE (d), the video data stored temporarily in the latch 228 is written in the overlapping region of the frame buffer RAM unit 226 at the corresponding address (FIG. 6,(g)).

In the manner described above, the video data stored in the auxiliary region as read out in the vertical direction are written in the overlapping region. It is now assumed that the horizontal synchronizing signal $H_{sync}$ (a) is supplied, whereby the data transfer signal DT(b) is set to a low level and outputted from the monostable multi-vibrator (MMV) 205, as is illustrated in FIG. 6 at (a). Then, the AND gate 233 stops outputting the clock signal. The multiplexer 225 is changed over to the counter 225, whereby the frame buffer RAM unit 226 performs data transfer to the internal serial memory. More specifically, the frame buffer RAM unit 226 performs data transfer of the video data for display supplied to a video output circuit (not shown) and corresponding to one horizontal period to the serial memory. Thus, even during the data transfer from the auxiliary region to the overlapping region, the picture being displayed undergoes no disturbance. The change-over of the locations to be displayed in the frame buffer RAM unit 226 is realized by rewriting the values of the registers 202 and 204.

As will be appreciated from the foregoing description, in the frame buffer memory according to the illustrated embodiment of the invention where the two display regions are provided in the partially overlapping relation together with the auxiliary regions provided in the area in which no overlap with the display region occurs, it is possible to transfer the video data at a high speed from the auxiliary region to the overlapping region upon changing-over of the first display region to the second display region. In other words, the pictures for display can instantaneously be changed over without need for increasing unnecessarily the capacity of the memory. Further, since the CPU does not directly participate in the data transfer, the burden which would otherwise be imposed on the CPU can be mitigated.

In conjunction with the embodiment shown in Fig. 6, it should be added that the horizontal and vertical address counters of the copy source and the copy destination as well as the latch function for storing temporarily the video data to be copied can be replaced, for example, by commercially available LSI such as graphic processor available under the name "HD 64400" from Hitachi, Ltd. of Japan.

Next, description will be made of a second exemplary embodiment of the frame buffer memory according to the present inventions by reference to FIGS. 7(A) and 7(B).

Figure 7A:
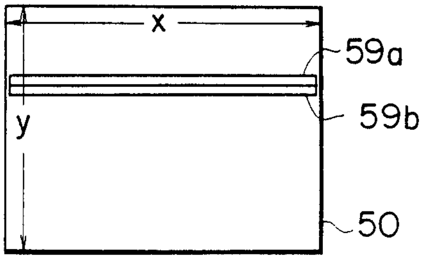
FIGS. 7A and 7B show a memory map for illustrating a structure of the frame buffer memory according to a second embodiment of the present invention.

FIG. 7(A) is a view showing schematically a configuration of the frame buffer memory according to the second embodiment of the invention. In this frame buffer memory, it is also assumed that the display screen 590 is of such a size that the pixel number x in the horizontal direction is 1920 with the pixel number y in the vertical direction being 1035, as in the case of the frame buffer memory according to the first embodiment. FIG. 7(B) shows a memory map for illustrating the address space of the frame buffer memory according to the second embodiment of the invention. Referring to FIG. 7(B), the column addresses are taken in the horizontal direction as viewed in the figure, and the row addresses are taken in the vertical direction. The addresses space consists of 1024 rows and 4096 columns. Provided within the address space are a first display region 52, a second display region 53, a first auxiliary region 54 and a second auxiliary region 55. The first display region 52 includes a non-overlapping subregion or area 56 which does not overlap the second display region 52, and an overlapping area 57 which overlaps the second display region 53. On the other hand, the second display region 53 consists of the overlapping area 57 and a non-overlapping area 58 which does not overlap the first display region 52. In the first and second display regions 52 and 53 of the frame buffer memory 51, the video data 59*a* and 59*b* of two successive lines of the frame 50 shown in FIG. 7(A) are stored at one row 60 without space, starting from the first column.

The frame memory of the structure described above can be adopted more profitably than the frame memory shown in FIG. 1 for such application in which a greater number of RAMs have to be connected in parallel to cope with a higher rate of the clock signal for reading out serially the video data. More specifically, in the case of the frame memory 1 according to the first embodiment of the invention, four multi-port RAMs 42*a* to 42*d* are connected in parallel with one another as shown in FIG. 3, whereby the memory block of 2048 columns$\times$215 rows$\times$4 bits is realized. The serial clock rate for the multi-port RAMs is set equal to $\frac{1}{4}$ of the dot clock rate for the picture to be displayed. In this conjunction, it is noted that in the case of a high definition picture, the dot clock rate exceeds 100 MHz, which in turn means that the parallel connection of the four RAMs is insufficient. In that case, more than four RAMs have to be connected in parallel, while the serial clock rate for each of the RAMs will have to be lowered.

Figure 7B:
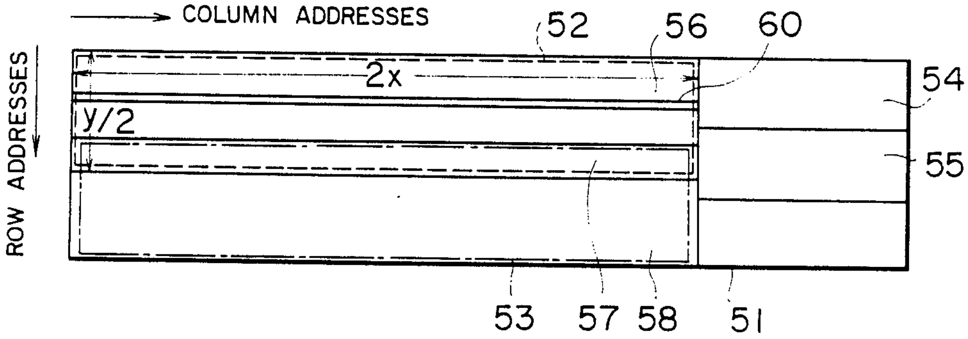

In the memory structure shown in FIG. 7(B), eight multi-port RAMs each of 1M bits are connected in parallel with one another, wherein the size of the memory block is set to be 4096$\times$521$\times$4 bits. With this memory structure, transfer of the video data to the serial port of the RAM is performed at the ratio of one to two horizontal scanning periods. During the period in which no the serial video data transfer is performed, the remaining video data of those transferred during the immediately preceding period are read out in succession. Further, in the case of the frame memory shown in FIGS. 7(A) and 7(B), the overlapping area 57 of the display regions 56 and 58 is of a size of 3840 columns$\times$11 rows. Accordingly, with mere replacement of the row addresses with the column addresses, it is impossible to establish the auxiliary regions 54 and 55. For this reason, the picture data of the overlapping region 57 is divided into 15 areas each of 256 columns$\times$11 rows upon storage in the auxiliary regions 54 and 55.

The frame memory structure shown in FIGS. 7(A) and 7(B) can be advantageously adopted even in such case where the pixels in the horizontal direction is of a small number, in addition to the case where the dot clock rate is high, as mentioned above. For a picture having less than 1024 pixels in the horizontal direction, by way of example, the utilization efficiency of the frame buffer memory 51 can be enhanced by adopting the structure shown in FIG. 7(B).

As will be appreciated from the above description, the second embodiment of the frame buffer memory implemented by using the multi-port video RAMs can ensure storage of two frames of the picture data as well as the high-speed change-over of these frames upon display thereof. Parenthetically, it should be added that the video data stored at one row in the frame memory 51 is not limited to two lines of the video data. In other words, more than one line of video data may be stored at one row in the frame buffer memory 51.

Next, third embodiment of the frame buffer memory according to the invention will be described by reference to FIG. 8.

Figure 8:
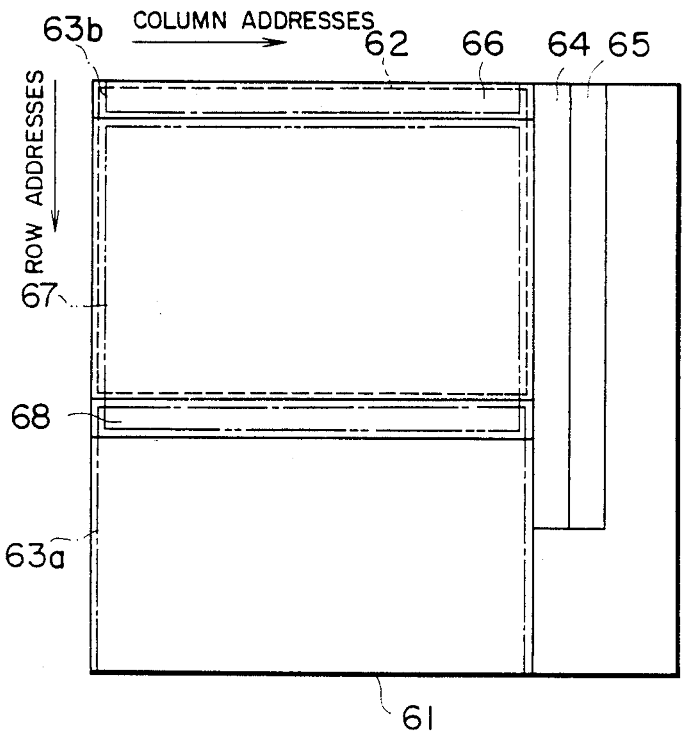
FIG. 8 shows a memory map for illustrating a structure of the frame buffer memory according to a third embodiment of the invention.
Figure 9A:
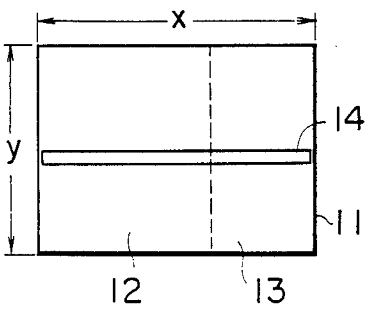
FIG. 9A PRIOR ART
FIGS. 9A to 9D show memory maps for illustrating structures of frame buffer memories known heretofore.
Figure 9B:
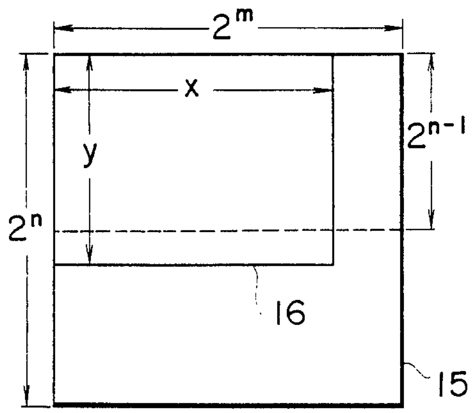
FIG. 9B PRIOR ART
Figure 9C:
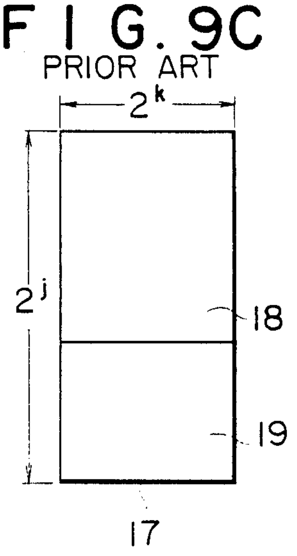
FIG. 9C PRIOR ART
Figure 9D:
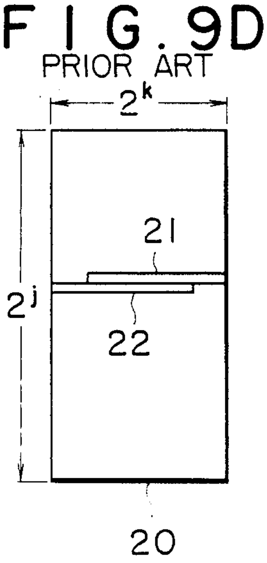
FIG. 9D PRIOR ART

FIG. 8 shows a memory map for the case in which the frame buffer memory is realized by using a ring buffer.

With the term "ring buffer", it is intended to mean a memory which is implemented such that the address value thereof attaining a maximum value is reset to a minimum value. By employing the ring buffer, it is possible to provide the display regions at given locations on the address space in an arbitrary manner. Referring to FIG. 8, when a first display region 62 is located or disposed starting from the first row of the frame buffer memory 61, the second display region (63*a*, 63*b*) is allocated with the rows starting from the one succeeding immediately to the first display region 62. As a result, the terminal portion 63*b* of the second display region 63*a* is again disposed so as to start from the first row of the frame memory 61. To say in another way, an overlapping area 66 of the first and second display regions 62 and 63*b* is disposed at the topmost location of the frame memory 61. Assignment of the memory space to regions 64 and 65 is realized similarly to the case of the first embodiment. After the video data have been written in the second display regions 63*a* and 63*b*, new video data are written in a third display region 67 which starts from the row succeeding immediately to the second display region 63*b*. An upper portion of the second display region 63*a* overlaps with a lower portion of the third display region 67. The overlapping region is shown at 68 in FIG. 8.

In this manner, every time the new video data is written, succeeding (fourth and fifth, for example) display regions are defined, starting from the rows which succeed to the immediately preceding display regions, respectively. At that time, the upper portion of the preceding display region and the lower portion of the renewed display region constitute constantly the overlapping region. Accordingly, the procedure for writing the video data can remain invariable. When the frame memory 61 of the instant embodiment of the invention is employed in the image processing apparatus shown in FIG. 2, the display region register 21 stores the start address of the display region.

As can be seen from the above description, the frame memory shown in FIG. 8 is provided with two display regions and the auxiliary regions for storing the video data contained in the overlapping region of the two display regions. In this case, the frame buffer memory for storing the two frames of video data and capable of changing over the two frames upon display at a high speed can be implemented by using the multi-port video RAMs.

The foregoing description has been made on the assumption that the two frames of picture are to be exchangeable displayed. It should however be understood that the concept underlying the frame buffer memory of the present invention is also applicable to such case where more than two frames are to be changed over.

We claim:

1. A frame buffer memory having a capacity greater than that required for storing video data of one frame, comprising:

(a) a plurality of display regions including at least a first display region and a second display region, said first and second display regions partially overlapping each other to thereby define an overlapping region, wherein each of said first and second display regions stores the video data of one frame; and (b) auxiliary regions provided outside of said plurality of display regions for storing the video data contained in said overlapping region.

2. A frame buffer memory according to claim 1, wherein in said plurality of display regions, said first display region is assigned with column addresses identical with those assigned to said second display region while said first and second display regions are assigned with mutually different row addresses, and wherein said auxiliary regions are assigned with column addresses differing from those assigned to said plurality of display regions.

3. A frame buffer memory according to claim 2, wherein said auxiliary region is assigned with the column addresses having greater values than those of the column addresses of said plural display regions.

4. A frame buffer memory according to claim 1, wherein when access is changed over from said first display region to said second display region for outputting the video data upon changing-over of the picture to be displayed, the video data stored in said auxiliary region is transferred to said overlapping region.

5. A frame buffer memory according to claim 1, wherein said auxiliary region is assigned with the column addresses corresponding to the values of the row addresses of said overlapping region and assigned with row addresses corresponding to the values of the column addresses of said overlapping region for allowing the video data stored in said auxiliary regions to be transferred to said overlapping region.

* * * * *